(12) United States Patent
Sylvester et al.

(10) Patent No.: US 12,438,503 B2
(45) Date of Patent: Oct. 7, 2025

(54) UNIVERSAL MOUNT FOR WIRE HANGER FOR SOLAR APPLICATIONS

(71) Applicant: Panduit Corp., Tinley Park, IL (US)

(72) Inventors: David J. Sylvester, Manhattan, IL (US); Mary G. Santschi, New Lenox, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 64 days.

(21) Appl. No.: 18/388,026

(22) Filed: Nov. 8, 2023

(65) Prior Publication Data

US 2025/0150029 A1    May 8, 2025

(51) Int. Cl.
*H02S 30/10*    (2014.01)
*F16B 9/02*    (2006.01)
*H02S 40/36*    (2014.01)

(52) U.S. Cl.
CPC ............. *H02S 40/36* (2014.12); *F16B 9/02* (2013.01); *H02S 30/10* (2014.12)

(58) Field of Classification Search
None
See application file for complete search history.

(56) References Cited

U.S. PATENT DOCUMENTS

| | | | |
|---|---|---|---|
| 1,705,233 A | 3/1929 | Brenizer | |
| 2,470,878 A * | 5/1949 | Tate | A22B 7/002 452/187 |
| 3,670,937 A * | 6/1972 | Bradshaw | A47G 25/1457 294/170 |
| 3,792,804 A * | 2/1974 | Ponzo | A47G 25/32 211/113 |
| 4,658,100 A | 4/1987 | Suris | |
| 4,909,466 A * | 3/1990 | Matthews | A47G 33/10 24/375 |
| 5,104,082 A * | 4/1992 | Bayer | F21V 5/06 248/303 |
| D333,087 S | 2/1993 | Tekirian | |
| 6,659,414 B1 * | 12/2003 | Guilmette | E06C 7/146 248/303 |
| 7,117,650 B2 | 10/2006 | Dockery | |
| 8,464,478 B2 | 6/2013 | Tweedie | |
| 8,801,214 B2 | 8/2014 | Chrysanthous | |
| 9,450,130 B2 | 9/2016 | Grushkowitz et al. | |
| 10,670,170 B2 * | 6/2020 | Shea | F16L 3/127 |

(Continued)

FOREIGN PATENT DOCUMENTS

| | | |
|---|---|---|
| EP | 1078188 B1 | 11/2003 |
| EP | 1438908 A1 | 7/2004 |

*Primary Examiner* — Steven M Marsh
(74) *Attorney, Agent, or Firm* — James H. Williams; Christopher S. Clancy (57) ABSTRACT

An assembly used to hang cable on a solar panel frame is disclosed. The assembly includes a wire hanger and a universal mount. The wire hanger has a first end with a hook, a main member, and a second end with a hook. The universal mount supports the wire hanger. The universal mount includes a first side that engages a mounting hole in the solar panel frame to connect the universal mount to the solar panel frame. The universal mount includes a second side that receives the wire hanger enabling the wire hanger and cable positioned therein to hang from the solar panel frame.

8 Claims, 8 Drawing Sheets

(56) References Cited

U.S. PATENT DOCUMENTS

| | | | |
|---|---|---|---|
| 2005/0087662 A1* | 4/2005 | Jacobs | F16L 3/14 |
| | | | 248/303 |
| 2007/0125028 A1 | 6/2007 | Lin | |
| 2012/0228447 A1 | 9/2012 | Barkdoll et al. | |
| 2013/0086852 A1 | 4/2013 | Tweedie | |
| 2021/0088158 A1* | 3/2021 | Libohova | F16L 3/14 |
| 2022/0038046 A1* | 2/2022 | Wedding | H02G 3/30 |
| 2022/0060006 A1* | 2/2022 | Naugler | F16L 3/233 |
| 2022/0074522 A1 | 3/2022 | Stubben et al. | |
| 2022/0356963 A1 | 11/2022 | Michael et al. | |
| 2022/0359102 A1 | 11/2022 | Michael et al. | |
| 2023/0147676 A1 | 5/2023 | Rand et al. | |
| 2023/0245798 A1 | 8/2023 | Michael et al. | |
| 2024/0039463 A1* | 2/2024 | Wedding | H02G 3/30 |

* cited by examiner

UNIVERSAL MOUNT FOR WIRE HANGER FOR SOLAR APPLICATIONS

FIELD OF THE INVENTION

The present invention relates to a wire hanger for solar applications, and more particularly to a universal mount for a wire hanger for solar applications.

BACKGROUND OF THE INVENTION

Global energy consumption continues to increase with a majority of the energy source coming from fossil fuels. While the demand for energy is unlikely to decrease, the source of energy is changing with the introduction of renewable energy. Renewable energy comes in many forms; however, solar energy has become economically viable and solar projects are increasing in number and scale.

Solar energy farms consist of numerous rows of photovoltaic (PV) panels mounted to frames. The frames can either be stationary or mobile to track the movement of the sun during daylight hours. The photovoltaic panels are electrically connected with taps that extend from the photovoltaic panel to photovoltaic run wires and cables. The run wires and cables are typically suspended or attached to the solar module frame or solar panel frame by a wire hanger, mount, clips, or cable tie.

The cable wire hangers support and route cables between solar panels. The solar module frames have predrilled holes or machines slots designed to receive grounding or bonding devices and wire hangers.

It would be desirable to provide a universal mount that allows wire hangers to be installed in a parallel or perpendicular orientation depending on the location of the solar module frame and the mounting holes therein thereby allowing cable to run parallel or perpendicular to the solar panels. It would also be desirable to provide a universal mount that allows a wire hanger to rotate up to 360 degrees.

SUMMARY OF THE INVENTION

The present invention is directed to an assembly that hangs cable routed along a solar panel frame. The assembly includes a wire hanger and a universal mount. The wire hanger has a first end with a hook, a main member, and a second end with a hook. The universal mount supports the wire hanger. The universal mount includes a first side and a second side that receives the wire hanger. The first side of the universal mount engages a mounting hole in the solar panel frame. The wire hanger suspends from the second side of the universal mount with the cable positioned therein.

DETAILED DESCRIPTION

Figure 1:
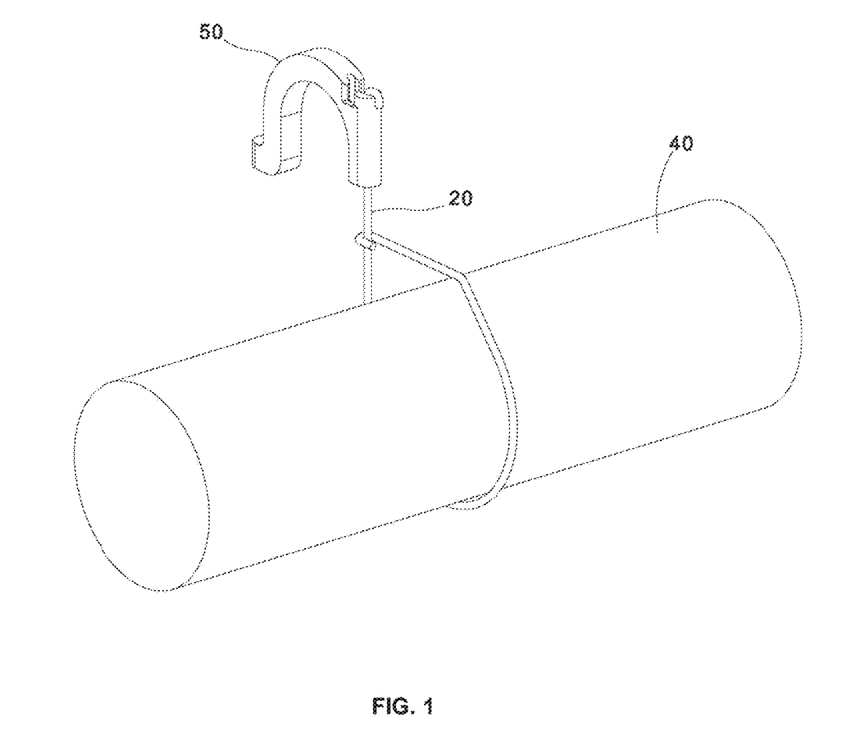
FIG. 1 is a perspective view of a universal mount and a wire hanger installed therein holding a cable.

FIG. 1 is a perspective view of a wire hanger 20 in a latched closed position installed in a universal mount 50 of the present invention. The wire hanger 20 holds a 2-inch diameter cable 40, however, the wire hanger may hold cables of other diameters.

Figure 2A:
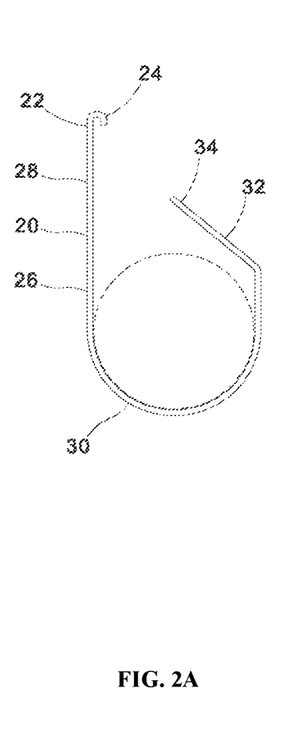
FIG. 2A is a side view of an unlatched wire hanger of FIG. 1.
Figure 2B:
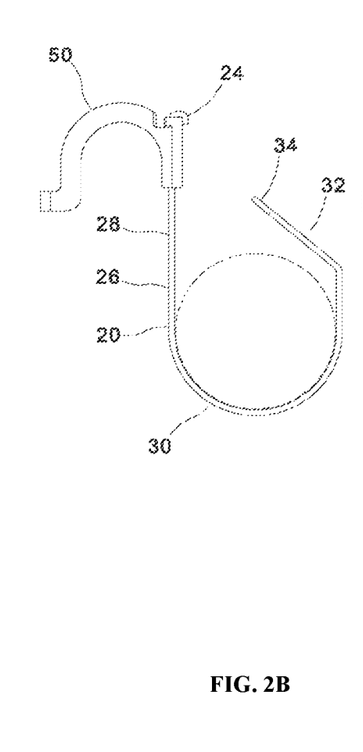
FIG. 2B is a side view of the unlatched wire hanger of FIG. 2A installed in the universal mount.
Figure 2C:
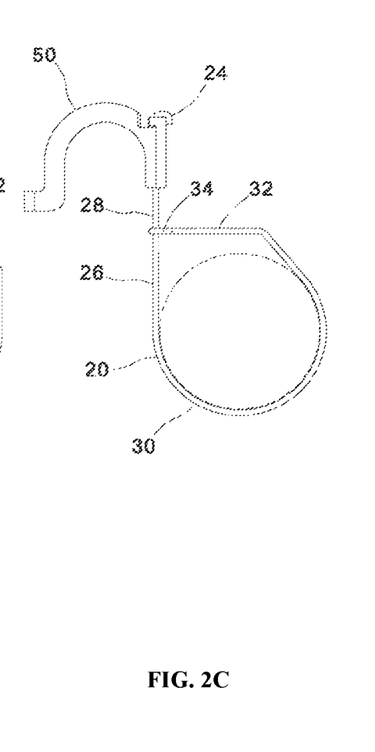
FIG. 2C is a side view of the wire hanger installed in the universal mount of FIG. 2B in a latched position.
Figure 3A:
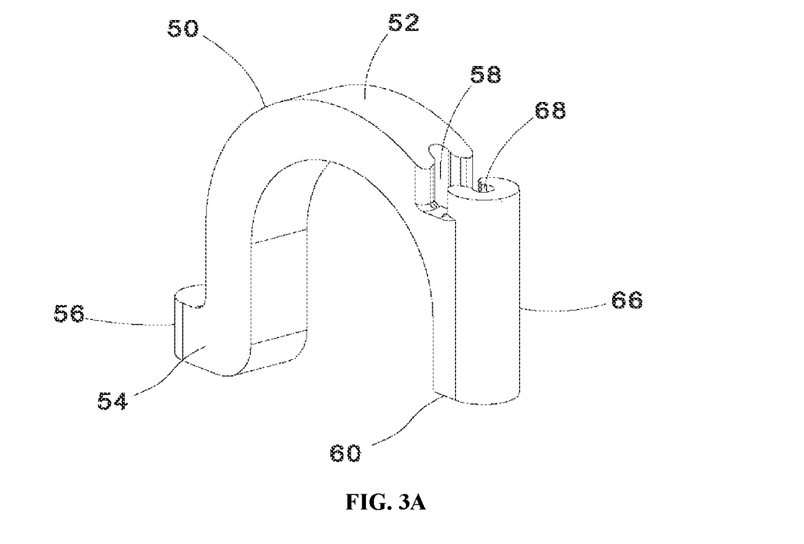
FIG. 3A is a right perspective view of the universal mount of FIG. 1.
Figure 3B:
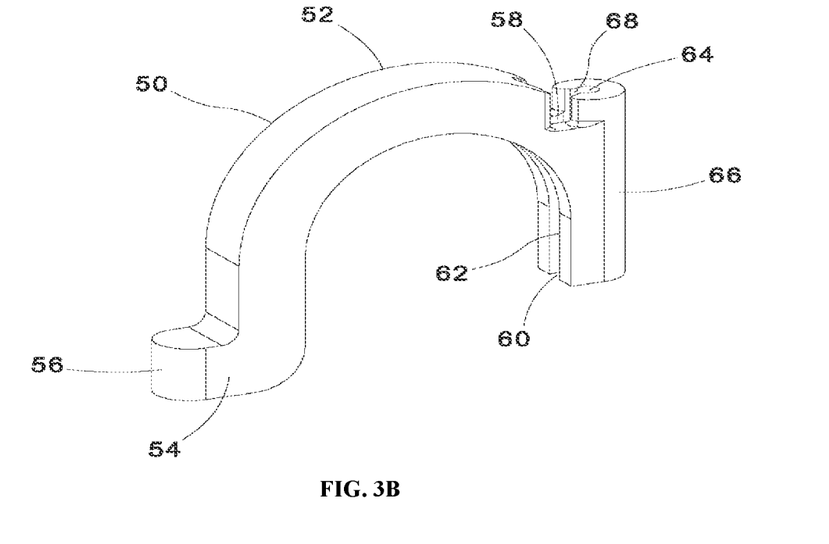
FIG. 3B is a left perspective view of the universal mount of FIG. 3A.
Figure 3C:
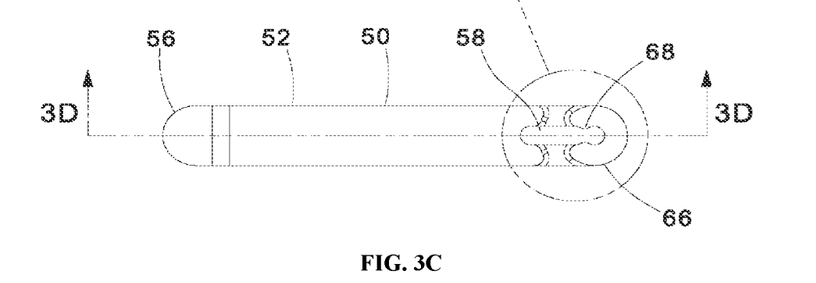
FIG. 3C is a top view of the universal mount of FIG. 3A.
Figure 3D:
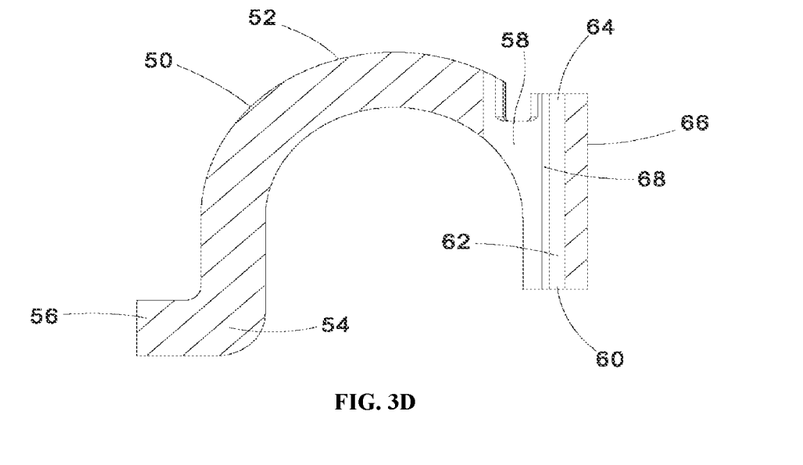
FIG. 3D is a cross sectional view of the universal mount of FIG. 3C taken along line 3D-3D.
Figure 3E:
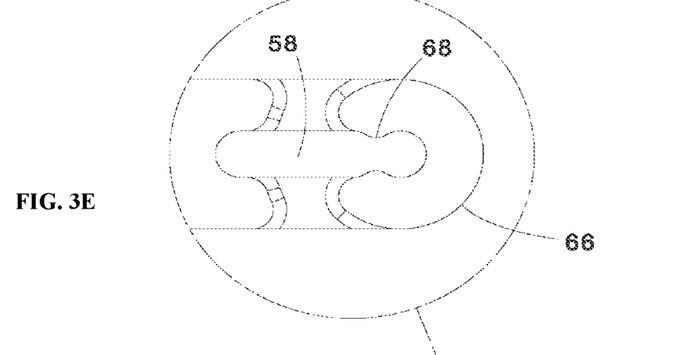
FIG. 3E is a top view of the locking pad and notches of the universal mount of FIG. 3C.

FIGS. 2A and 2B illustrate the wire hanger 20 in an unlatched open position. The wire hanger 20 includes a first end 22 with a hook 24, a J shaped main member 26, and a second end 32 with a hook 34. The J shaped main member 26 includes a stem 28 and a semicircular section 30. The wire hanger 20 is formed from a material, such as galvanized steel or stainless steel if additional corrosion resistance is required, that allows the wire hanger 20 to have some spring characteristics. The spring characteristics allow the wire hanger 20 to be installed and then latched closed to secure the cable 40 positioned on the semicircular section 30 of the main member 26. FIG. 2C illustrates the second end 32 of the wire hanger 20 hooked onto the stem 28 of the main member 26 to latch the wire hanger 20 in a closed position.

Figure 6A:
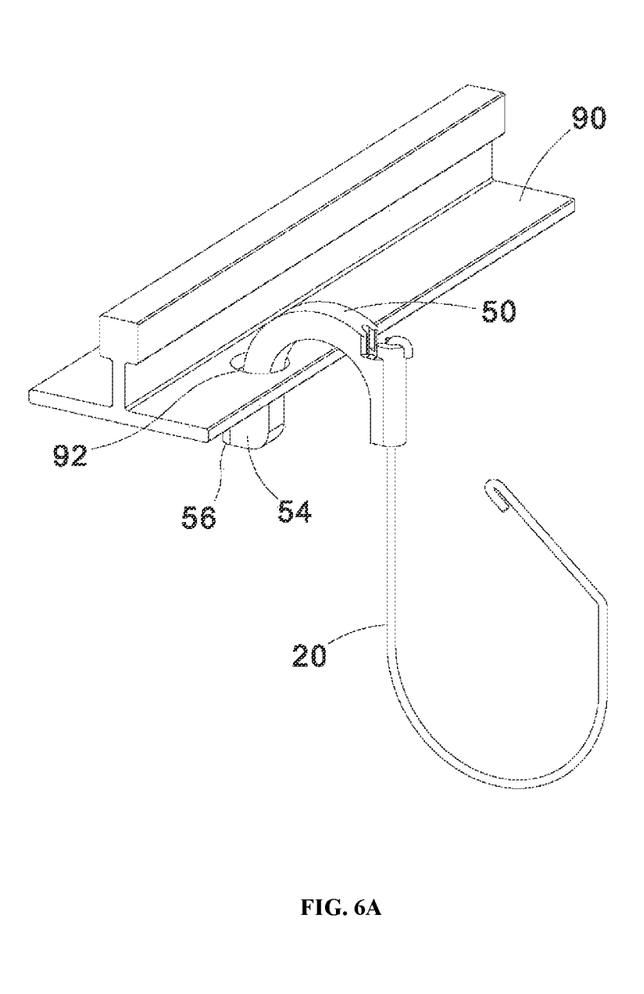
FIG. 6A is a perspective view of the universal mount and wire hanger of FIG. 5C installed in a horizontal solar panel frame.
Figure 6B:
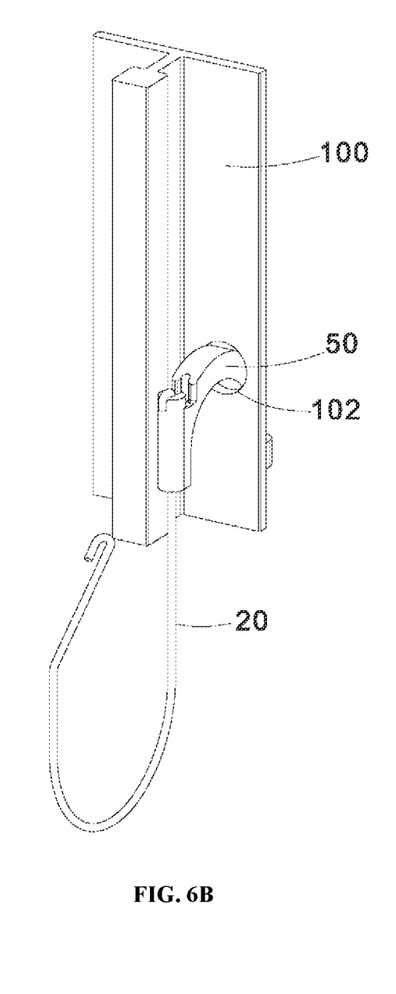
FIG. 6B is a perspective view of the universal mount and wire hanger of FIG. 5C installed in a vertical solar panel frame.

FIGS. 3A-3E illustrate the universal mount 50 of the present invention. The universal mount 50 is formed from a plastic material, such as Nylon 6.12 or another suitable polymer. As illustrated in FIGS. 6A and 6B and as discussed below, the universal mount 50 hooks on to a solar panel frame 90, 100 so the wire hanger 20 does not have to hang directly from the solar panel frame 90, 100.

The universal mount 50 includes an arch shaped member 52 with a free end 54 at a first side and a pocket 58 at a second opposite side. The free end 54 includes a retainment knob 56. The pocket 58 includes an entrance end 60, a wire pathway 62, and an exit end 64. The wire pathway 62 extends from the entrance end 60 to the exit end 64. The pocket 58 is surrounded by a locking pad 66 with notches 68 that lock the wire hanger 20 into the pocket 58 while allowing the wire hanger to rotate up to 360 degrees when installed therein.

Figure 4:
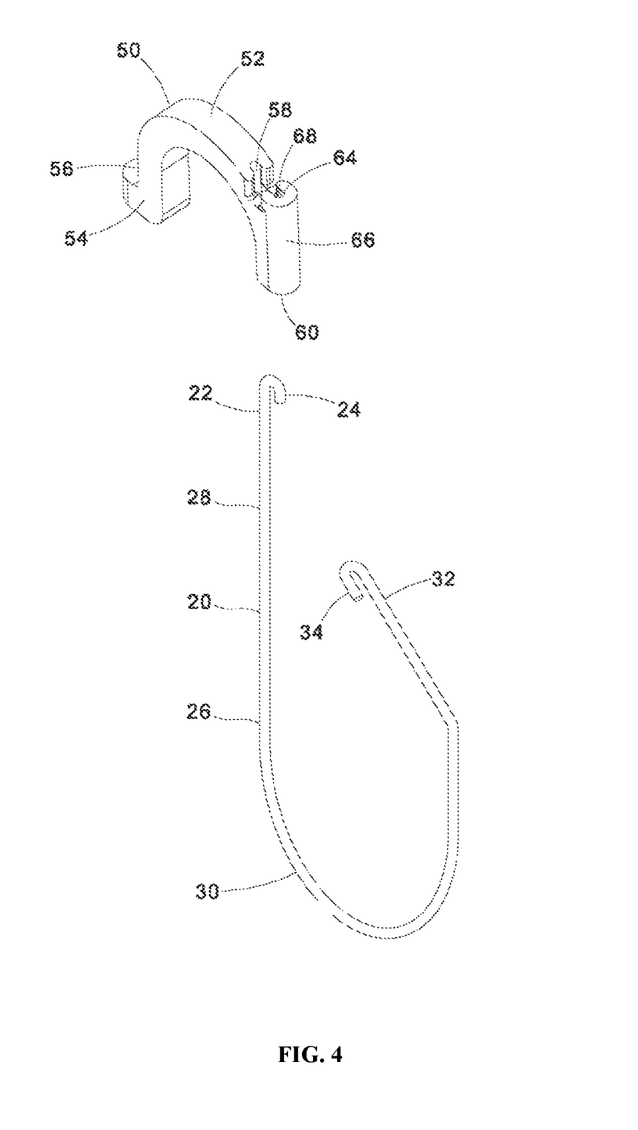
FIG. 4 is an exploded view of the universal mount and unlatched wire hanger of FIG. 1.
Figures 5A, 5B:
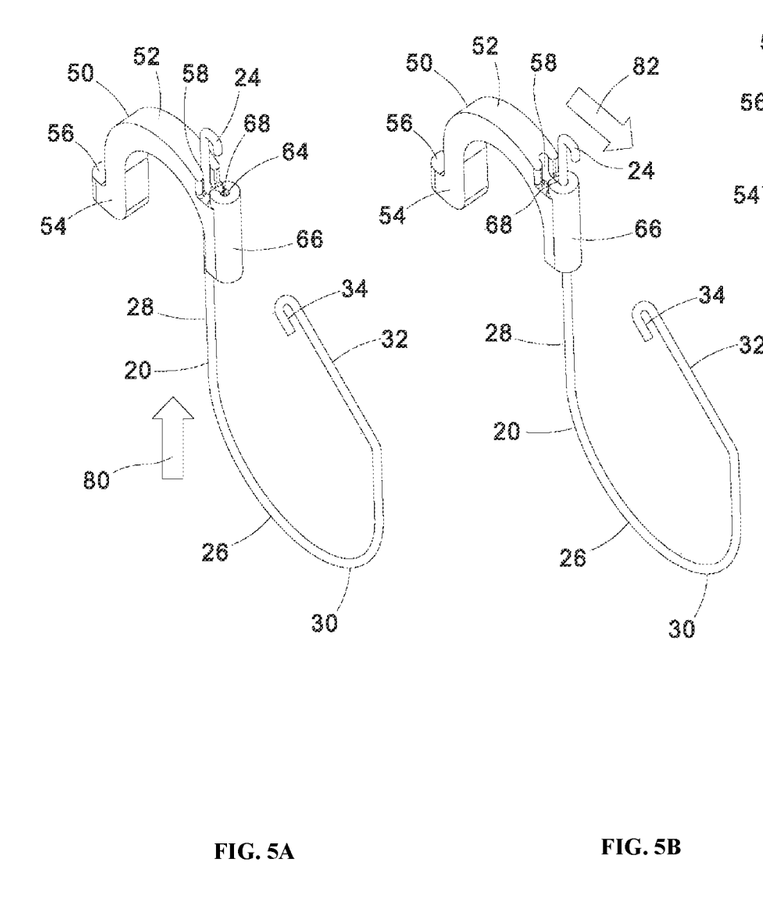
FIG. 5A is a perspective view of the unlatched wire hanger inserted into the universal mount of FIG. 4.
FIG. 5B is a perspective view of the unlatched wire hanger of FIG. 5A partially installed in the universal mount.
Figure 5C:
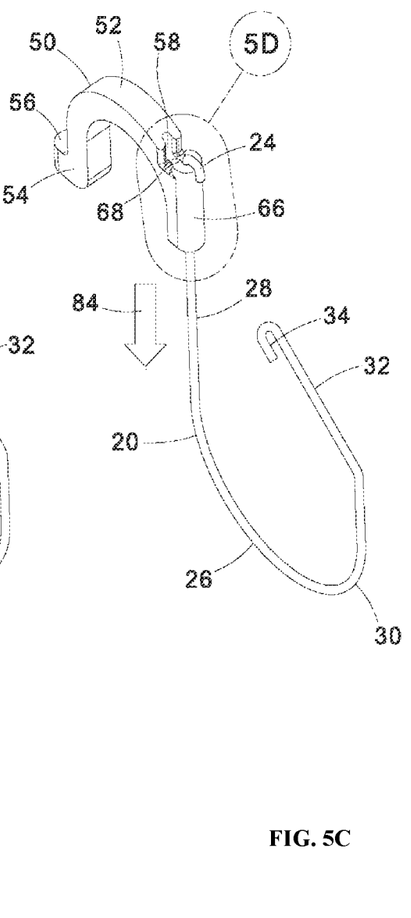
FIG. 5C is a perspective view of the unlatched wire hanger of FIG. 5A installed in the universal mount.
Figure 5D:
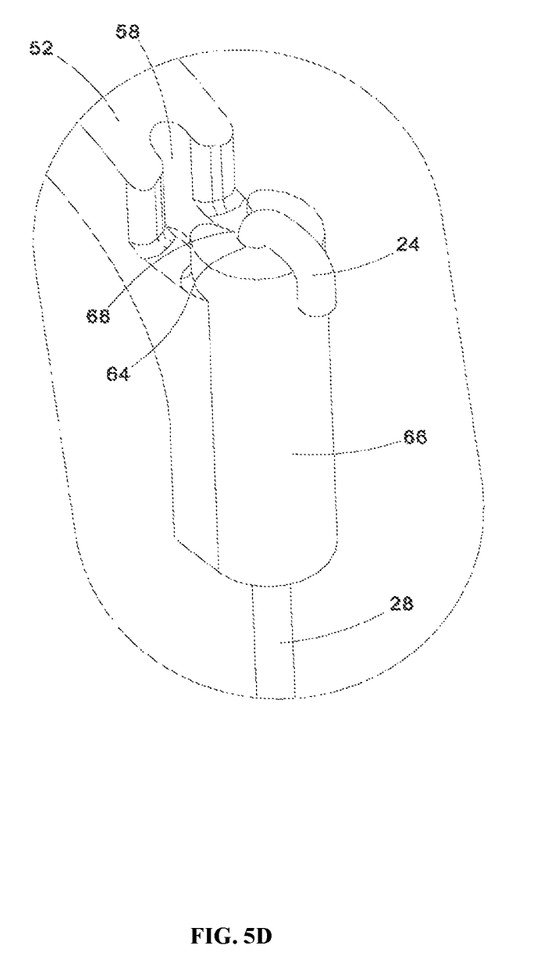
FIG. 5D is a perspective view of the wire hanger in the pocket of the universal mount of FIG. 5C.

FIG. 4 illustrates the universal mount 50 and the wire hanger 20 prior to assembly. FIGS. 5A-5C illustrate the universal mount 50 and the wire hanger 20 as it is assembled. As illustrated in FIG. 4, the pocket 58 of the universal mount 50 is aligned with the hook 24 at the first end 22 of the wire hanger 20 and the stem 28 of the main member 26. As illustrated in FIG. 5A, the hook 24 at the first end 22 and the stem 28 of the main member 26 of the wire hanger 20 are raised upwards (see arrow 80) into the entrance end 60, through the wire pathway 62, and out the exit end 64 of the pocket 58 of the universal mount 50. The hook 24 at the first end 22 extends above the pocket 58 of the universal mount 50. As illustrated by the arrow 82 in FIG. 5B, the hook 24 and the main member 26 are shifted toward the locking pad 66. As illustrated by the arrow 84 in FIG. 5C, the wire hanger 20 is pulled downward to an installed position. As illustrated in FIGS. 5C and 5D, in the installed positioned the hook 24 at the first end 22 engages the locking pad 66 and the notches 68 secure the wire hanger in the pocket allowing the wire hanger 20 to rotate up to 360 degrees, if desired. Prior to pulling the wire hanger downwards, the wire hanger may be rotated up to 360 degrees, as desired, to a specific position.

FIG. 6A illustrates a horizontally orientated solar panel frame or solar module frame 90 with a mounting hole 92. The universal mount 50 with wire hanger 20 is installed in the mounting hole 92. The universal mount 50 hangs through the mounting hole 92 and the retainment knob 56 of the universal mount 50 ensures that the universal mount 50 will remain attached to the horizontal solar panel frame 90. FIG. 6B illustrates a vertically orientated solar panel frame or solar module frame 100 with a mounting hole 102. The universal mount 50 with wire hanger 20 is installed in the mounting hole 102. The universal mount 50 hangs through the mounting hole 102 and the retainment knob 56 of the universal mount 50 ensures that the universal mount 50 will remain attached to the vertical solar panel frame 100.

The universal mount of the present invention enables the wire hanger to rotate up to 360 degrees to a desired position within the pocket of the universal mount when secured to the solar panel frames. The shape of the universal mount enables the universal mount to hook into both the mounting holes in a solar panel frame extending in either a horizontal or parallel orientation or a vertical or perpendicular orientation. As a result, the universal mount is easy to use and versatile for various solar panel frames.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. An assembly for hanging cable on a solar panel frame, the assembly comprising:
    a wire hanger having a first end with a hook, a main member, and a second end with a hook; and
    a universal mount supporting the wire hanger, wherein the universal mount includes a first side for connecting to the solar panel frame and a second side for receiving the wire hanger;
    wherein the universal mount has a pocket at the second side, the pocket has an entrance end, a wire pathway, and an exit end: wherein a locking pad surrounds the pocket, and the locking pad has notches for securing the wire hanger within the pocket when the wire hanger is installed therein,
    whereby the first side of the universal mount is adapted to engage a mounting hole in the solar panel frame and the wire hanger is adapted to suspend from the second side of the universal mount with a cable positioned therein.

2. The assembly of claim 1, wherein the universal mount has an arch shaped member.

3. The assembly of claim 1, wherein the universal mount has a retainment knob at the first side.

4. The assembly of claim 1, wherein the wire hanger rotates within the pocket of the universal mount.

5. The assembly of claim 1, wherein the main member of the wire hanger has a stem and a semicircular portion.

6. The assembly of claim 5, wherein the semicircular portion olds a cable and the hook at the second end of the wire hanger engages the stem to secure the cable within the wire hanger.

7. The assembly of claim 1, wherein the universal mount is mounted in a parallel orientation with respect to the solar panel frame.

8. The assembly of claim 1, wherein the universal mount is mounted in a perpendicular orientation with respect to the solar panel frame.

* * * * *